(12) United States Patent
Takai et al.

(10) Patent No.: US 8,088,353 B2
(45) Date of Patent: Jan. 3, 2012

(54) GROUP II METAL SULFIDE PHOSPHOR PRECURSOR AND METHOD FOR PRODUCING PHOSPHOR

(75) Inventors: Jun Takai, Kurashiki (JP); Yoshihisa Tsuji, Kurashiki (JP); Hideharu Iwasaki, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/742,940

(22) PCT Filed: Nov. 11, 2008

(86) PCT No.: PCT/JP2008/070492
§ 371 (c)(1), (2), (4) Date: May 14, 2010

(87) PCT Pub. No.: WO2009/063857
PCT Pub. Date: May 22, 2009

(65) Prior Publication Data
US 2010/0260662 A1 Oct. 14, 2010

(30) Foreign Application Priority Data

Nov. 14, 2007 (JP) ................. 2007-295245
Jun. 4, 2008 (JP) ................. 2008-146908

(51) Int. Cl.
*C01B 17/20* (2006.01)
*C01G 9/08* (2006.01)

(52) U.S. Cl. .......... 423/511; 423/21.1; 423/37; 423/48; 423/49; 423/50; 423/518; 423/566.1; 252/301.6 R; 252/301.6 S (58) Field of Classification Search .............. 423/511, 423/566.1, 518, 37, 48, 49, 50, 21.1; 252/301.6 R, 252/301.6 S
See application file for complete search history.

(56) References Cited

U.S. PATENT DOCUMENTS 3,850,837 A * 11/1974 Nath .................. 252/301.4 S
2003/0232005 A1 12/2003 Okada et al.
2009/0014687 A1 1/2009 Kaskel et al.

FOREIGN PATENT DOCUMENTS

| JP | 2003 20228 | 1/2003 |
| JP | 2004 18709 | 1/2004 |
| JP | 2004 149387 | 5/2004 |
| JP | 2004 256698 | 9/2004 |
| JP | 2005 132947 | 5/2005 |
| JP | 2007 523221 | 8/2007 |

* cited by examiner

*Primary Examiner* — Timothy Vanoy
(74) *Attorney, Agent, or Firm* — Oblon, Spivak, McClelland, Maier & Neustadt, L.L.P.

(57) ABSTRACT

A process for producing a Group II metal sulfide phosphor precursor, comprising adding to an organic solvent an aqueous solution containing at least one of a Group II element compound, a sulfurizing agent, and a compound containing any of copper, silver, manganese, gold, and rare-earth elements to obtain a reaction mixture, heating the reaction mixture to produce an azeotrope of the water and the organic solvent, and removing water from the reaction mixture to produce a desired Group II metal sulfide in the reaction mixture, wherein the removal of water from the reaction mixture occurs by recovering only the water condensed from a vapor produced by the azeotropic distillation.

30 Claims, 3 Drawing Sheets

GROUP II METAL SULFIDE PHOSPHOR PRECURSOR AND METHOD FOR PRODUCING PHOSPHOR

TECHNICAL FIELD

The present invention relates to a Group II element-containing sulfide phosphor and a process for producing a precursor thereof.

BACKGROUND ART

Group II-IV compound semiconductors are used as pigments utilizing their colors. Group II-IV compound semiconductors are extensively used especially because they exhibit various colors that depend on a combination of different metals. Specifically, Group II-IV compound semiconductors are used for applications, including solar cells, light receiving devices, and image recording devices, by using their semiconducting and photoconducting properties. Also, Group II-IV compound semiconductors are extensively used in EL devices, CRTs, and lighting equipment by using their fluorescence properties. A Group II-IV compound phosphor is generally prepared by reaction of a sulfurizing agent with a metal salt. Specifically, a process for the production of a phosphor in which a metal such as copper is doped as an activator is known (see Patent Citation 1). There is also known a process for the production of a phosphor in which two or more solutions containing raw materials of the phosphor are fed continuously and simultaneously to obtain the phosphor containing copper and manganese as luminescent metal centers (see Patent Citation 2).

However, it is difficult to uniformly dope a metal into a sulfide phosphor by using the conventionally known liquid phase synthetic processes, since in such processes a rate of sulfurization reaction by using a sulfurizing agent such as thioacetamide is not constant, and a composition of the resulting sulfide phosphor could vary over a reaction time. Thus, there have been questions about uniformity of concentration distributions of doped metals in sulfide phosphors obtained by the conventional liquid phase synthetic processes. Further, since sulfides are soluble in water, the sulfide of an expensive metal is dissolved in an aqueous solution and eluted off when used in a step of producing a sulfide phosphor. Thus, there has been a problem that it is difficult to efficiently dope a metal element into the resulting sulfide. Furthermore, a portion of a metal sulfide is hydrolyzed into a hydroxide and, further, into an oxide, which may be included as an impurity into a sulfide phosphor. This could lead to a decrease in efficiency of the phosphor.

Patent Document 1: JP 2005-132947
Patent Document 2: JP 2004-18709

DISCLOSURE OF THE INVENTION

Problem to be Solved by the Invention

Accordingly, an object of the present invention is to achieve uniform doping of an activator metal into a base material of a phosphor precursor compound and efficient inclusion of a doping metal in the base material during the production of a Group II metal sulfide phosphor or a precursor thereof.

Means for Solving the Problem

As a result of extensive and intensive studies, the present inventors found that a phosphor in which an activator metal is uniformly and efficiently introduced could be obtained by adding to an organic solvent an aqueous solution containing a Group II element compound, a sulfurizing agent, and an activator metal source compound, heating the mixture, removing water from the reaction mixture by azeotropic dehydration to produce a Group II metal sulfide, and firing the resulting product. Based on this finding, the present invention was accomplished by the inventors.

Specifically, the aspects of present invention are provided below.

[1] A process for producing a Group II metal sulfide phosphor precursor, comprising:

adding to an organic solvent an aqueous solution containing at least one of a Group II element compound, a sulfurizing agent, and a compound containing any of copper, silver, manganese, gold, and rare-earth elements to obtain a reaction mixture, and heating the reaction mixture to produce an azeotrope of the water and the organic solvent, and removing the water from the reaction mixture to produce a desired Group II metal sulfide in the reaction mixture, wherein the removal of the water from the reaction mixture is carried out by recovering only the water condensed from a vapor produced by the azeotropic distillation.

[2] A process for producing a Group II metal sulfide phosphor precursor, comprising:

adding, with mixing, to an organic solvent an aqueous solution containing at least one of a Group II element compound and a compound containing any of copper, silver, manganese, gold, and rare-earth elements and an aqueous solution containing a sulfurizing agent to obtain a reaction mixture, heating the reaction mixture to produce an azeotrope of the water and the organic solvent, and removing the water from the reaction mixture to produce a desired Group II metal sulfide in the reaction mixture, wherein the removal of the water from the reaction mixture is carried out by recovering only the water condensed from a vapor produced by the azeotropic distillation.

[3] A process for producing a Group II metal sulfide phosphor precursor, comprising:

adding an aqueous solution containing at least one of a Group II element compound and a compound containing any of copper, silver, manganese, gold, and rare-earth elements to an organic solvent in which a sulfurizing agent is dissolved, to obtain a reaction mixture, heating the reaction mixture to produce an azeotrope of the water and the organic solvent and removing the water from the reaction mixture to produce a desired Group II metal sulfide in the reaction mixture, wherein the removal of the water from the reaction mixture is carried out by recovering only the water condensed from a vapor produced by the azeotropic distillation.

[4] The process of any one of Items [1] to [3], wherein the Group II element compound is a zinc compound.

[5] The process of any one of Items [1] to [4], wherein the Group II element compound is an organic acid salt.

[6] The process of any one of Items [1] to [4], wherein the Group II element compound is a mineral acid salt.

[7] The process of Item [6], wherein an acid is added to the aqueous solution containing the Group II element compound and the resulting acid containing solution is added to the sulfurizing agent containing solution so that the pH of the reaction mixture is adjusted to 3 or blow.

[8] The process of Item [7], wherein the acid is a mineral acid.

[9] A process for producing a Group II metal sulfide phosphor, comprising further firing a phosphor precursor produced by the process of any one of Items [1] to [8].

Advantages of the Invention

A production process of the present invention achieves uniform doping of an activator metal into a base material of a phosphor precursor, and consequently an improvement in efficiency of utilization of the metal to be doped.

BEST MODE FOR CARRYING OUT THE INVENTION

The present invention is described below in detail.

A Group II element compound to be used in the present invention includes but not limited to any compound containing at least one of calcium, magnesium, strontium, cadmium, and zinc. In view of stability of the Group II element compounds in an aqueous solution, zinc, cadmium, or magnesium is preferably used. Examples of compounds that can be used include a salt of a mineral acid such as hydrochloric acid, sulfuric acid, nitric acid, and phosphoric acid, a salt of an organic acid such as formic acid, acetic acid, butyric acid, and oxalic acid, and a complex salt with a ligand such as an acetylacetonato ligand.

With regard to selection of the Group II element compound, it may be used either singly or as a mixture of plural compounds. For example, in view of thermal stability and adsorption and persistence after the removal of water by azeotropic dehydration from a solvent contained in a reaction mixture, an organic acid salt may be used. On the other hand, a salt of a mineral acid such as hydrochloric acid and sulfuric acid has an advantage that it may be used as a raw material under an appropriate pH control to produce phosphor precursor particles having a uniform particle size, while it has a disadvantage of causing hydrolysis more easily than an organic acid salt. Further, when phosphor precursor particles produced by using an organic acid salt as a raw material are subjected to firing treatment, carbon residues may be produced in the resulting fired product, whereas no carbon residue would be produced in case of a phosphor precursor particles produced by using a mineral acid salt, due to pyrolysis of the mineral acid ions. Therefore, in view of ease of particle size control, and in order to avoid formation of carbon residues after the firing, a mineral acid salt may be used as a raw material compound.

A compound containing any of silver, copper, gold, manganese, and rare-earth elements includes but not limited to a salt with a mineral acid such as hydrochloric acid, sulfuric acid, nitric acid, and phosphoric acid, a salt with an organic acid such as formic acid, acetic acid, butyric acid, and oxalic acid, and a complex salt with a ligand such as an acetylacetonato ligand. In view of thermal stability and adsorption and persistence after the removal of water by azeotropic dehydration from a reaction mixture, an organic acid salt is preferably used. The compound may be used either singly or as a mixture of plural compounds.

As necessary, a compound containing an element acting as a donor, such as aluminum, gallium, and indium, against any of silver, copper, manganese, and a rare-earth elements, each of which acts as an acceptor, may be contained in a liquid phase so that such a donor element can be included in a sulfide product.

A sulfurizing agent to be used in the present invention includes but not limited to alkaline metal sulfides such as hydrogen sulfide, sodium sulfide, and potassium sulfide, thioamides such as thioacetamide and thioformamide, and thiourea. In view of decomposition temperature, stability, and persistence of decomposed materials, hydrogen sulfide, thioacetamide, or thiourea is preferably used.

The water to be used for dissolving a Group II compounds, a sulfurizing agent and the like in the present invention may be an ion exchanged water having an ash content of 100 ppm or below, more preferably 10 ppm or below, which can avoid reaction of the Group II element compound or sulfurizing agent with impurities contained in the water from causing limitations on uses of the Group II-VI compound semiconductors In the present invention, when an aqueous solution of a Group II element compound is prepared, a concentration of a Group II element compound in an aqueous solution would not be an critical factor in terms of uniformity, as long as the compound is completely dissolved. However, an excessively high concentration is not preferred; as a reaction product precipitates, the reaction is inhibited and the reaction rate is decreased. An excessively low concentration also is not preferred, since a volumetric efficiency decreases enormously. Therefore, a concentration of a Group II element compound is adjusted to 0.01 to 2 mol/L, more preferably 0.1 to 1.5 mol/L.

With regard to the amount of a compound containing any of silver, copper, gold, manganese, and a rare-earth elements, and that of a compound containing an element acting as a donor against silver, copper, manganese, and a rare-earth element, each of which acts as an acceptor, each of the compounds may be preferably used in such an amount that a weight of the metal element to be doped is 0.1 to 150000 ppm, more preferably 1 to 50000 ppm, based on a weight of the resulting phosphor precursor; in view of an inclusion effect and economical efficiency, an amount of 2 to 10000 ppm is especially preferable. Prior to using the compound containing such an element(s), it may be added to an aqueous solution of a Group II element compound.

A sulfurizing agent may be used in an amount equivalent to a molar ratio of 0.5 to 5 with respect to the molar amount of a Group II element used. Since the reaction is adversely affected by a Group II metal that remains unreacted, the sulfurizing agent is normally used at a molar ratio of 1.0 to 4, and more preferably 1.1 to 2, with respect to the molar amount of the Group II element used.

A concentration of a sulfurizing agent in an aqueous solution would not become a critical factor in terms of uniformity, as long as the sulfurizing agent is soluble in the aqueous solution. However, an excessively high concentration is not preferred, because an unreacted sulfurizing agent is precipitated and remains in a desired product. An excessively low concentration also is not preferred, because an unreacted Group II element compound is precipitated and remains in a desired product. To avoid such problems, the concentration of the sulfurizing agent in an aqueous solution is adjusted to 0.01 to 2 mol/L, more preferably 0.1 to 1.5 mol/L.

When hydrogen sulfide is used as a sulfurizing agent, it may be dissolved in water and then added concurrently with a Group II element compound, or alternatively may be continuously fed in the form of a gas into a reaction liquid. Examples of the feeding processes include a process in which hydrogen sulfide gas is fed to a liquid phase section of a reactor and a process in which hydrogen sulfide gas is fed to a vapor phase section.

An organic solvent to be used in the present invention includes but not limited to any organic solvent from which water can be separated by azeotropic dehydration. Specific examples of organic solvents that can be used include saturated hydrocarbons such as hexane, cyclohexane, heptane, octane, cyclooctane, nonane, decane, dodecane, cyclododecane, and undecane; aromatic hydrocarbons such as toluene, xylene, and mesitylene; halogenated hydrocarbons such as carbon tetrachloride, 1,2-dichloroethane, and 1,1,2,2-tetrachloroethylene; halogenated aromatic hydrocarbons such as chlorobenzene and dichlorobenzene; ethers such as dibutyl ether, diisobutyl ether, diamyl ether, diisoamyl ether, dihexyl ether, dicyclohexyl ether, dioctyl ether, dicyclooctyl ether, anisole, phenylethyl ether, phenylpropyl ether, and phenylbutyl ether; alcohols such as hexylalcohol, heptylalcohol, octylalcohol, and cyclooctylalcohol; and esters such as butyl acetate, amyl acetate, isoamyl acetate, butyl butyrate, amyl butyrate, and isoamyl butyrate. In view of stability of a solvent, safety, water removal efficiency, and loss of a produced sulfide and a raw material salt due to dissolution, it is preferable to use a saturated hydrocarbon or an aromatic hydrocarbon, especially an saturated hydrocarbon having 8-12 carbon atoms or an aromatic hydrocarbon having 8-12 carbon atoms. Decane, dodecane, and xylene are especially preferred.

An amount of a solvent to be used is not particularly limited, and would not be a critical factor as long as the amount of a solvent is maintained at a level greater than an amount of added aqueous solution in which a Group II element compound is dissolved.

A process for producing a phosphor precursor according to the present invention can be practiced in the range of 30° C. to 200° C. However, in view of safety and operability, the process of the present invention is carried out at a temperature that does not require use of any special experimental facilities, reactor or the like, i.e., 40° C. to 230° C. or, in view of a decomposition rate of thioacetamide, 60° C. to 200° C., more preferably 80° C. to 180° C.

Although the production of a phosphor precursor of the present invention can be practiced in any atmosphere, it is preferable to carry out the production in the presence of an inert gas such as nitrogen and argon, or in the presence of hydrogen sulfide gas, which is a sulfurizing agent, or in the presence of a gas of a mixture thereof, since the presence of oxygen sometimes makes it difficult to perfectly control inhibition of oxidation of a product or the like.

In the present invention, an aqueous solution of a raw material compound is added to an organic solvent to prepare a reaction mixture, while water is removed from the reaction mixture by using azeotropy between the water and the organic solvent. To readily produce an azeotropic state of water and an organic solvent, the organic solvent may be preheated before a raw material compound is added. For example, an organic solvent may be preheated to a temperature that is lower than a boiling point of the organic solvent by 1° C. to 50° C., preferably a temperature that is lower than the boiling point by 3° C. to 45° C., more preferably a temperature that is lower than the boiling point by 5° C. to 30° C.

When a mineral acid salt is used as one of the raw material compounds, i.e., a Group II element compound, phosphor precursor particles having a uniform particle size distribution can be obtained by adjustment of a pH of a reaction mixture. It is especially preferable to adjust the pH of the reaction mixture to below 3; at pH<3, variations in the particle size are decreased enormously. In view of ease of control of the particle size, the pH is preferably adjusted to pH<2.5. In view of adverse effects of corrosion on an apparatus under strongly acidic conditions and the like, it is most preferable to adjust the pH such that 1<pH<2. Neither a process for the pH adjustment nor a pH adjuster is particularly limited. Normally, an appropriate amount of an acid (e.g., mineral acid) is added in advance to a solution containing a Group II element compound, and the resulting acid-containing solution is added to a sulfurizing agent-containing solution so that the pH of the reaction mixture can be adjusted relatively easily.

A Group II metal sulfide deposited in a reaction mixture is separated from a liquid phase medium and, if necessary, heated and/or dried at a reduced pressure.

A drying temperature is not particularly limited, and the drying is normally carried out at 10° C. to 200° C. However, since the presence of even a trace of moisture may cause oxidation of a Group II metal sulfide, the drying is preferably carried out at 150° C. or below, preferably 30° C. to 120° C.

After the drying, the Group II metal sulfide is heated and fired in the presence of an inert gas or a hydrogen sulfide-containing reducing gas at 400° C. to 1200° C., more preferably 500° C. to 1100° C., so that it can be converted into a phosphor.

A rate of heating to a firing temperature is not particularly limited, but the heating rate is normally 0.1 to 10° C./min. An excessively high heating rate is not preferred, since a furnace body or a vessel containing zinc sulfide would be damaged. An excessively low rate also is not preferred, since the production efficiency would be decreased enormously. In view of the foregoing, the heating is carried out preferably at a rate of 0.5 to 6° C./min.

In the present invention, a flux may be used to promote crystallization in the firing or to increase a particle size. Examples of fluxes that can be used include alkaline metal salts such as sodium chloride and potassium chloride, alkaline earth salts such as magnesium chloride, calcium chloride, and magnesium chloride, ammonium chloride, and zinc chloride. The flux may be used as a single component or as a mixture of plural components. An amount to be used is not particularly limited. It is preferable to use the flux in an amount of 0.1 to 20% by weight with respect to zinc sulfide, and more preferable to use 0.5 to 5% by weight in view of operability and economical efficiency.

In the present invention, a sulfur element may be added to compensate for the loss of sulfur in the firing. An amount to be added is not particularly limited. Normally, the amount to be added is 0.5 to 10 parts by weight, and more preferably 1 to 5 parts by weight with respect to 100 parts by weight of zinc sulfide.

In the present invention, after the firing is finished, the fired product is washed. Surplus of the added flux is removed by the washing. A neutral water, acidic water, or oxidizing water can be used in the washing. Acidic components to be used include but not limited to a mineral acid such as hydrochloric acid, sulfuric acid, nitric acid, and phosphoric acid, and an organic acid such as acetic acid, propionic acid, and butyric acid. The acid may be used as a single acidic component or as a mixture of plural acidic components. Oxidizing components that can be used include hydrogen peroxide, persulfuric acid, peracetic acid, and salts thereof, and an organic peroxide such as t-butylhydroperoxide. The oxidizing component may be used as a single oxidizing component or as a mixture of plural oxidizing components. An oxidizing component and an acidic component may be used separately or as a mixture. When an aqueous solution containing an acidic or oxidizing component is used as an acidic or an oxidizing water, the concentration of the acidic or oxidizing component in the aqueous solution is preferably 0.05 to 10% by weight, more preferably 0.1 to 5% by weight, based on the weight of the aqueous solution. In view of decomposition of a Group II metal sulfide and persistence of ions on a Group II metal sulfide surface, it is preferable to use hydrochloric acid or acetic acid as an acidic component and hydrogen peroxide or peracetic acid as an oxidizing component. When zinc sulfide is brought into contact with a high-concentration acidic substance, it may be decomposed. Thus, when the acidic water is used, the concentration of the acidic component in the aqueous solution is preferably 0.05 to 10% by weight, more preferably 0.1 to 5% by weight, based on the weight of the aqueous solution. In view of decomposition of a Group II-VI compound semiconductor and persistence of ions on a surface, use of acetic acid is preferred.

In the present invention, after the firing is finished, the fired product is preferably washed with a neutral water, acidic water, or oxidizing water and then washed with an ion exchanged water to remove excess metals and ionic components adhering to a Group II metal sulfide surface. To reduce limitations on uses of a Group II metal sulfide phosphor, it is preferable to use an ion exchanged water with an ash content of 100 ppm or below, more preferably an ion exchanged water with an ash content of 10 ppm or below.

As necessary, a Group II metal sulfide phosphor is dried by heating at a reduced pressure. A drying temperature is not particularly limited, and the drying is typically carried out at 10° C. to 200° C. However, since the presence of even a trace of water may cause oxidation of a Group II metal sulfide, the drying is preferably carried out at 150° C. or below, preferably 30° C. to 120° C.

Formation of a phosphor can be confirmed by measurement of a quantum efficiency. A quantum efficiency is a ratio of a number of photons emitted as a result of excitation by incident light to a number of photons of the incident light absorbed by a substance. A greater quantum efficiency indicates a higher doping effect. Quantum efficiencies can be measured by a fluorescence spectrophotometer.

EXAMPLES

The following Examples illustrate the present invention in detail, but are not intended to limit the scope of the present invention.

Conditions of measurement of quantum efficiencies by a fluorescence spectrophotometer are as follows.

Measurement apparatus: FP-6500 of JASCO Corporation
Excitation wavelength: 350 nm
Excitation bandwidth: 5 nm
Software: Spectra Manager for Windows (registered trademark) 95/NT Ver 1.00.00 2005 of JASCO Corporation Example 1

In 500 g of ion exchanged water, 65.9 g of zinc acetate dihydrate, 0.032 g of silver nitrate, 0.008 g of gallium nitrate octahydrate, 45.0 g of thioacetamide, and 5 g of acetic acid were dissolved. The silver nitrate contained silver in an amount equivalent to 700 ppm with respect to the weight of the product, and the gallium nitrate octahydrate contained gallium in an amount equivalent to 50 ppm with respect to the weight of the product. A 2-L three-necked flask was equipped with a Dean-Stark trap, a reflux condenser, a thermometer, and a stirrer, and 800 ml of o-xylene was charged into the flask. The system was purged with nitrogen. An internal temperature of an oil bath was adjusted to 150° C., and the o-xylene in the reactor was heated to 130° C. Then, while a solution containing zinc acetate was added at a rate of 100 ml per hour, and distillate water was removed by the Dean-Stark trap, the reaction proceeded. All the aqueous solution was continuously fed in about 6 hours. Further, removal of moisture in the system was carried out for 30 minutes. After cooling to a room temperature, a sulfide was formed and precipitated, and the organic solvent was removed to recover a desired product. The product was dried by a vacuum dryer at 100° C. for 12 hours. An amount of the recovered product was 28.9 g, which was 98% of a theoretical amount.

A metal content of the product was analyzed by sampling a precipitate every 1 hour in the 6-hour feeding and then measuring a concentration of a metal in the precipitate by ICP emission analysis. The results of the analysis are shown in Table 1.

Example 2

The procedure of Example 1 was repeated, except that 0.05 g of copper nitrate was used in place of the silver nitrate, to recover 28.4 g. The copper nitrate contained copper in an amount 700 ppm with respect to the weight of the product. The results of ICP analysis are shown in Table 1.

Example 3

The procedure of Example 1 was repeated, except that 0.7 mg of triammonium hexachloroiridate was added in addition to the silver nitrate, to recover 29.0 g. The triammonium hexachloroiridate contained indium in an amount equivalent to 10 ppm with respect to the weight of the product. The results of ICP analysis are shown in Table 1.

Example 4

The procedure of Example 2 was repeated, except that 0.7 mg of triammonium hexachloroiridate was added in addition to the copper nitrate, to recover 28.1 g. The triammonium hexachloroiridate contained indium in an amount equivalent to 10 ppm with respect to the weight of the product. The results of ICP analysis are shown in Table 1.

Example 5

The procedure of Example 1 was repeated, except that 4.57 g of manganese(II) acetate was used in place of the silver nitrate, to recover 28.6 g. The manganese(II) acetate contained manganese in an amount equivalent to 5000 ppm with respect to the weight of the product. The results of ICP analysis are shown in Table 1.

Example 6

The procedure of Example 5 was repeated, except that 0.76 g of indium nitrate was added in addition to the manganese(II)

acetate, to recover 28.4 g. The indium nitrate contained indium in an amount equivalent to 1000 ppm with respect to the weight of the product. The results of ICP analysis are shown in Table 1.

Example 7

The procedure of Example 4 was repeated, except that decane was used in place of the o-xylene, to recover a product. The results of ICP analysis are shown in Table 1.

Example 8

In 500 g of ion exchanged water, 65.9 g of zinc acetate dihydrate, 0.032 g of silver nitrate, and 0.008 g of gallium nitrate octahydrate were dissolved. The silver nitrate contained silver in an amount equivalent to 700 ppm with respect to the weight of the product, and the gallium nitrate octahydrate contained in an amount equivalent to 50 ppm with respect to the weight of the product. A 2-L three-necked flask was equipped with a Dean-Stark trap, a reflux condenser, a thermometer, and a stirrer, and 800 ml of decane was charged into the flask. The system was purged with nitrogen. An internal temperature of an oil bath was adjusted to 150° C., and the decane in the reactor was heated to 130° C. Then, while a solution containing zinc acetate was added at a rate of 100 ml per hour concurrently with addition of hydrogen sulfide at a rate of 60 ml per minute, and distillate water was removed by the Dean-Stark trap, the reaction proceeded. All the aqueous solution was continuously fed in about 6 hours. Further, removal of moisture in the system was carried out for 30 minutes. After cooling to a room temperature, a sulfide was formed and precipitated, and the organic solvent was removed to recover a desired product. The product was dried by a vacuum dryer at 100° C. for 12 hours. A amount of the recovered product was 28.8 g, which was 98% of a theoretical amount.

TABLE 1

|  | Time elapsed (hrs) | Ag (ppm) | Ga (ppm) | Cu (ppm) | Ir (ppm) | Mn (ppm) | In (ppm) |
| --- | --- | --- | --- | --- | --- | --- | --- |
| Example 1 | 1 | 691 | 53 | — | — | — | — |
|  | 2 | 703 | 49 | — | — | — | — |
|  | 3 | 682 | 48 | — | — | — | — |
|  | 4 | 693 | 46 | — | — | — | — |
|  | 5 | 702 | 51 | — | — | — | — |
|  | 6 | 689 | 48 | — | — | — | — |
| Example 2 | 1 | — | 51 | 699 | — | — | — |
|  | 2 | — | 46 | 697 | — | — | — |
|  | 3 | — | 49 | 693 | — | — | — |
|  | 4 | — | 46 | 709 | — | — | — |
|  | 5 | — | 48 | 701 | — | — | — |
|  | 6 | — | 49 | 692 | — | — | — |
| Example 3 | 1 | 693 | 46 | — | 8 | — | — |
|  | 2 | 702 | 51 | — | 9 | — | — |
|  | 3 | 706 | 52 | — | 11 | — | — |
|  | 4 | 693 | 49 | — | 7 | — | — |
|  | 5 | 695 | 48 | — | 9 | — | — |
|  | 6 | 691 | 48 | — | 9 | — | — |
| Example 4 | 1 | — | 50 | 689 | 9 | — | — |
|  | 2 | — | 49 | 692 | 8 | — | — |
|  | 3 | — | 50 | 690 | 8 | — | — |
|  | 4 | — | 48 | 684 | 9 | — | — |
|  | 5 | — | 46 | 688 | 7 | — | — |
|  | 6 | — | 47 | 690 | 8 | — | — |
| Example 5 | 1 | — | — | — | — | 4978 | — |
|  | 2 | — | — | — | — | 4993 | — |
|  | 3 | — | — | — | — | 4992 | — |
|  | 4 | — | — | — | — | 4980 | — |
|  | 5 | — | — | — | — | 5012 | — |
|  | 6 | — | — | — | — | 4983 | — |
| Example 6 | 1 | — | — | — | — | 4976 | 912 |
|  | 2 | — | — | — | — | 4981 | 967 |
|  | 3 | — | — | — | — | 4956 | 981 |
|  | 4 | — | — | — | — | 4982 | 977 |
|  | 5 | — | — | — | — | 4989 | 983 |
|  | 6 | — | — | — | — | 4982 | 984 |
| Example 7 | 1 | — | 49 | 699 | 9 | — | — |
|  | 2 | — | 50 | 701 | 11 | — | — |
|  | 3 | — | 49 | 694 | 8 | — | — |
|  | 4 | — | 51 | 695 | 9 | — | — |
|  | 5 | — | 50 | 697 | 8 | — | — |
|  | 6 | — | 49 | 695 | 9 | — | — |
| Example 8 | 1 | 694 | 52 | — | — | — | — |
|  | 2 | 701 | 50 | — | — | — | — |
|  | 3 | 680 | 49 | — | — | — | — |
|  | 4 | 689 | 46 | — | — | — | — |
|  | 5 | 709 | 51 | — | — | — | — |
|  | 6 | 601 | 49 | — | — | — | — |

Comparative Example 1

The procedure of Example 1 was repeated, except that no o-xylene was used during the heating of the prepared aqueous solution, to recover 23.1 g of a product. The results of ICP analysis are shown in Table 2.

Comparative Example 2

The procedure of Example 2 was repeated, except that no o-xylene was used during the heating of the prepared aqueous solution, to recover 22.9 g of a product. The results of ICP analysis are shown in Table 2.

Comparative Example 3

The procedure of Example 4 was repeated, except that no azeotropic dehydration using o-xylene was carried out during the heating of the prepared aqueous solution, to recover 22.9 g of a product. The results of ICP analysis are shown in Table 2.

TABLE 2

|  | Time elapsed (hrs) | Ag (ppm) | Ga (ppm) | Cu (ppm) | Ir (ppm) | Mn (ppm) | In (ppm) |
| --- | --- | --- | --- | --- | --- | --- | --- |
| Comparative Example 1 | 1 | 632 | 32 | — | — | — | — |
|  | 2 | 623 | 27 | — | — | — | — |
|  | 3 | 617 | 14 | — | — | — | — |
|  | 4 | 619 | 14 | — | — | — | — |
|  | 5 | 615 | 15 | — | — | — | — |
|  | 6 | 612 | 11 | — | — | — | — |
| Comparative Example 2 | 1 | — | 33 | 629 | — | — | — |
|  | 2 | — | 29 | 622 | — | — | — |
|  | 3 | — | 25 | 643 | — | — | — |
|  | 4 | — | 19 | 611 | — | — | — |
|  | 5 | — | 15 | 612 | — | — | — |
|  | 6 | — | 13 | 609 | — | — | — |
| Comparative Example 3 | 1 | — | 21 | 641 | 0 | — | — |
|  | 2 | — | 19 | 632 | 0 | — | — |
|  | 3 | — | 16 | 627 | 0 | — | — |
|  | 4 | — | 19 | 619 | 0 | — | — |
|  | 5 | — | 14 | 609 | 0 | — | — |
|  | 6 | — | 10 | 592 | 0 | — | — |

Example 9

In 50 g of ion exchanged water, 98 g of zinc chloride, 0.080 g of copper sulfate pentahydrate, 0.016 g of diammonium hexachloroiridate, and 2 g of hydrochloric acid were dissolved. The copper sulfate pentahydrate contained copper in an amount equivalent to 500 ppm with respect to the weight of the product. In ion exchanged water, 110.0 g of thioacetamide was dissolved to obtain 1000 ml of a mixture. A 2-L four-necked flask was equipped with a Dean-Stark trap, a reflux condenser, a thermometer, and a stirrer, and 1000 ml of decane was charged into the flask. The system was purged with nitrogen. An internal temperature of an oil bath was adjusted to 150° C., and the decane in the reactor was heated to 130° C. Then, while a solution containing zinc chloride was added at a rate of 0.33 ml of per minute, a solution containing thioacetamide was added at a rate of 3.3 ml per minute, so that the solutions were mixed with each other. The mixture had a pH of 2.5. While distillate water was removed by the Dean-Stark trap, the reaction proceeded. All the aqueous solutions were fed in about 5 hours. Further, removal of moisture in the system was carried out for 30 minutes. After cooling to a room temperature, a sulfide was formed and precipitated, and the organic solvent was removed to recover a desired product. The product was dried by a vacuum dryer at 100° C. for 12 hours. A recovered amount was 57.4 g, which was 82% of a theoretical amount.

A metal content of the product was analyzed by sampling a precipitate every 1 hour in the 5-hour feeding and then measuring a concentration of a metal in the precipitate by an ICP emission process. The results of analysis are shown in Table 3.

Figure 1:
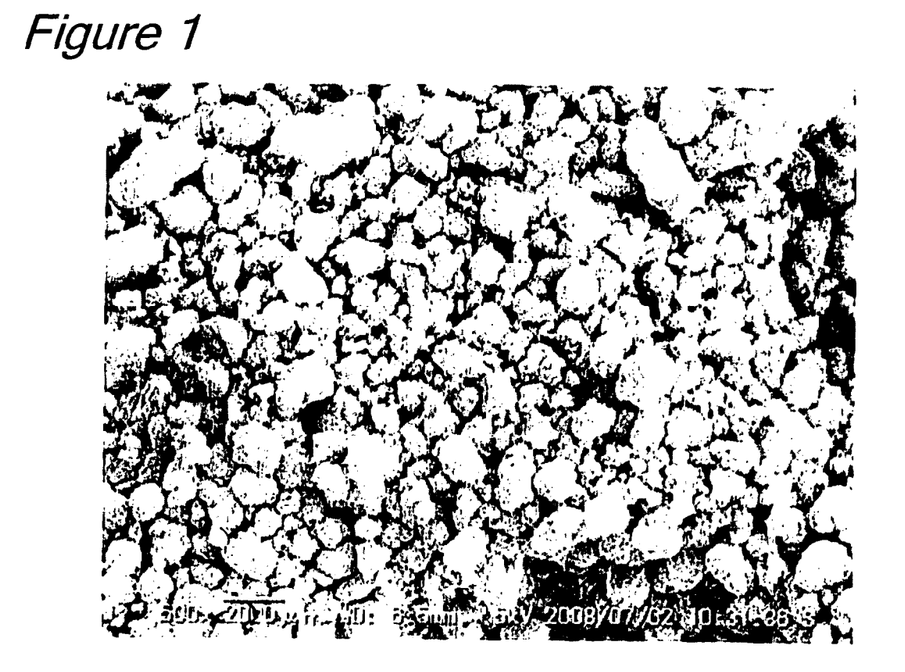
FIG. 1 An SEM photograph showing phosphor precursor particles obtained in Example 9.
Figure 2:
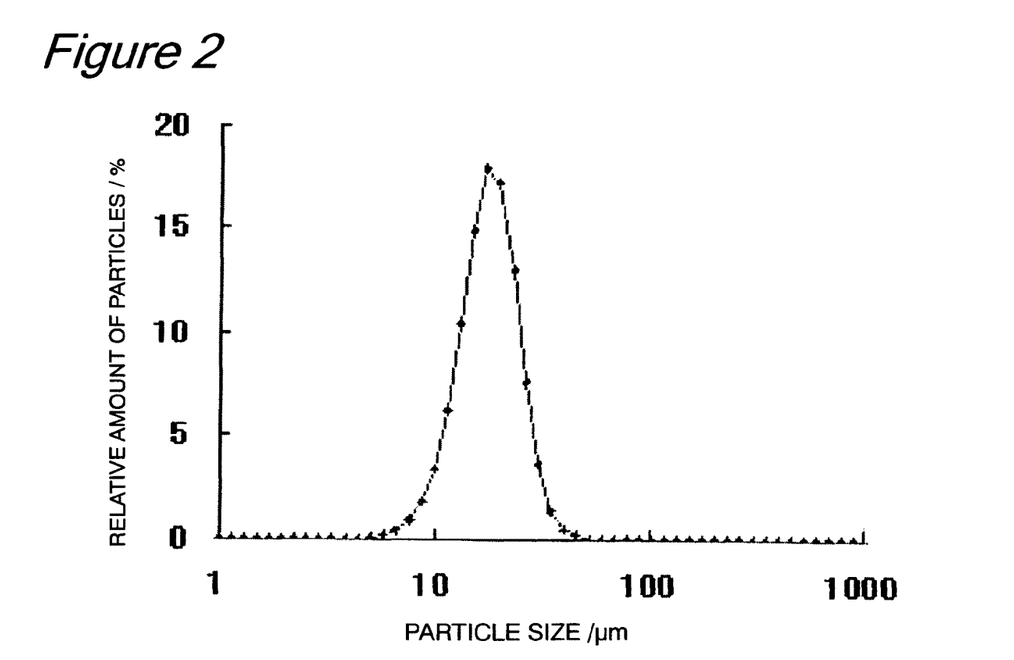
FIG. 2 A particle size distribution of the phosphor precursor particles obtained in Example 9.

An SEM photograph of the resulting particles is shown in FIG. 1, and a particle size distribution of the particles is shown in FIG. 2.

Example 10

In ion exchanged water contained in a vessel, 207 g of zinc sulfate heptahydrate, 0.080 g of copper sulfate pentahydrate, 0.016 g of diammonium hexachloroiridate, and 2 g of sulfuric acid were dissolved to obtain 1000 ml of a mixture. The copper sulfate pentahydrate contained copper in an amount equivalent to 500 ppm with respect to the weight of the product. In ion exchanged water contained in another vessel, 110.0 g of thioacetamide was dissolved to obtain 1000 ml of a mixture. A 2-L four-necked flask was equipped with a Dean-Stark trap, a reflux condenser, a thermometer, and a stirrer, and 1000 ml of decane was charged into the flask. The system was purged with nitrogen. An internal temperature of an oil bath was adjusted to 150° C., and the decane in the reactor was heated to 130° C. Then, while a solution containing zinc sulfate heptahydrate was added at a rate of 3.3 ml per minute, a solution containing thioacetamide was added at a rate of 3.3 ml per minute, so that the solutions were mixed with each other. The mixture had a pH of 1.8. While distillate water was removed by the Dean-Stark trap, the reaction proceeded. All the aqueous solutions were fed in about 5 hours. Further, moisture in the system was removed for 30 minutes. After cooling to a room temperature, a sulfide was formed and precipitated, and the organic solvent was removed to recover a desired product. The product was dried by a vacuum dryer at 100° C. for 12 hours. A recovered amount was 63.7 g, which was 91% of a theoretical amount.

A metal content of the product was analyzed by sampling a precipitate every 1 hour in the 5-hour feeding and then measuring a concentration of a metal in the precipitate by ICP emission spectrometry. The results of analysis are shown in Table 3.

Figure 3:
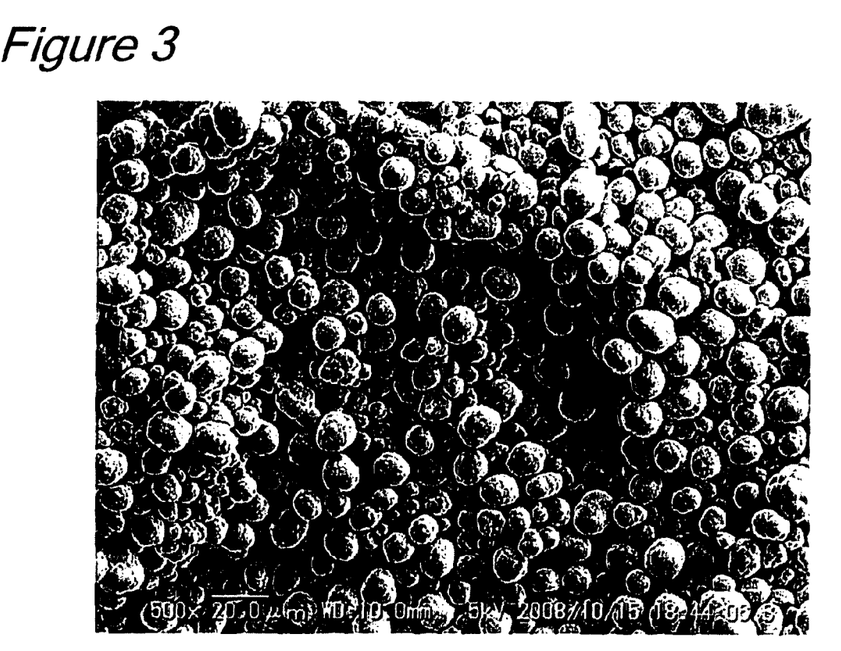
FIG. 3 An SEM photograph showing phosphor precursor particles obtained in Example 10.
Figure 4:
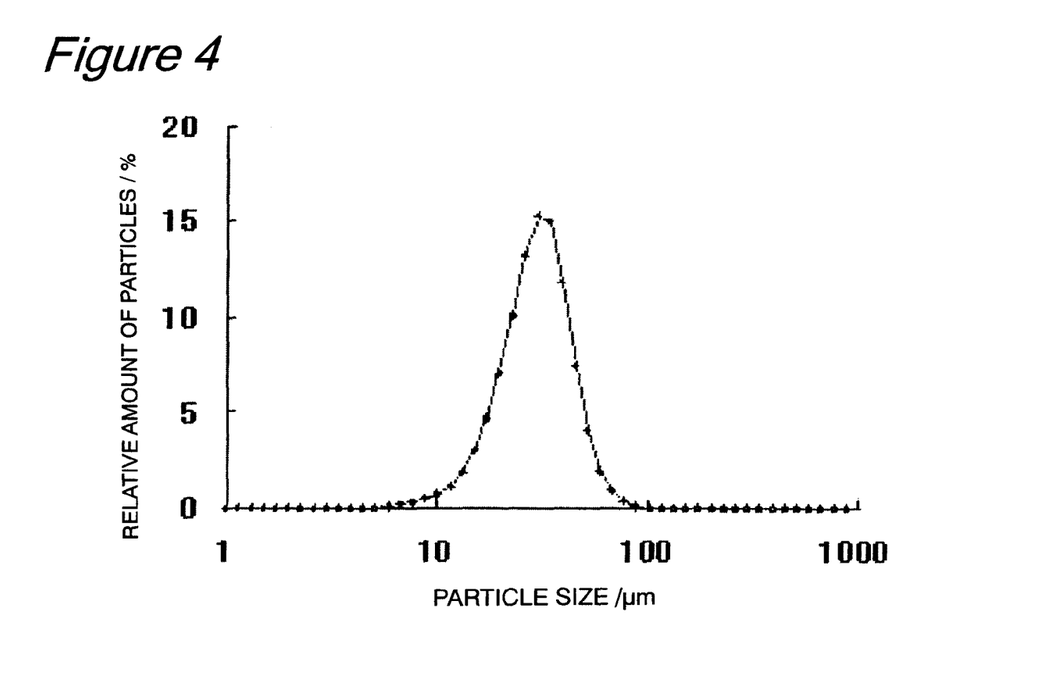
FIG. 4 A particle size distribution of the phosphor precursor particles obtained in Example 10.

An SEM photograph of the resulting particles is shown in FIG. 3, and a particle size distribution of the particles is shown in FIG. 4.

Example 11

Figure 5:
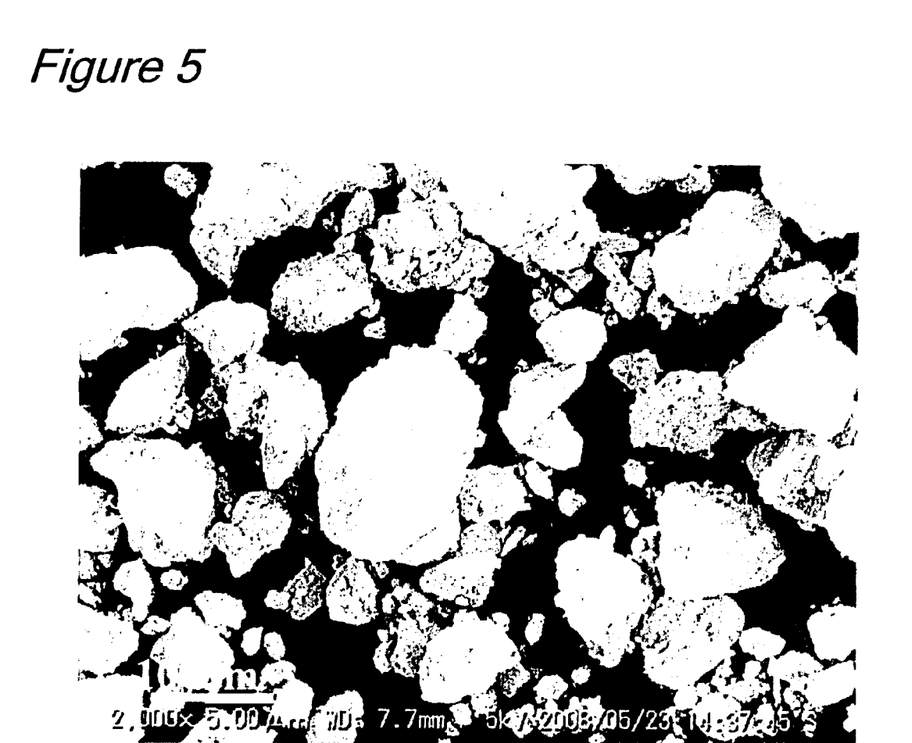
FIG. 5 An SEM photograph showing phosphor precursor particles obtained in Example 11.

The procedure of Example 9 was repeated, except that 2 g of hydrochloric acid was not added. The resulting mixture had a pH of 3.1. An SEM photograph of the resulting particles is shown in FIG. 5.

The resulting particles were randomly aggregated and had different particle sizes and shapes; the particle sizes were not controlled.

TABLE 3

|  | Time elapsed (hrs) | Ag (ppm) | Ga (ppm) | Cu (ppm) | Ir (ppm) | Mn (ppm) | In (ppm) |
|---|---|---|---|---|---|---|---|
| Example 9 | 1 | — | — | 489 | 11 | — | — |
|  | 2 | — | — | 492 | 13 | — | — |
|  | 3 | — | — | 490 | 15 | — | — |
|  | 4 | — | — | 484 | 11 | — | — |
|  | 5 | — | — | 487 | 17 | — | — |
| Example 10 | 1 | — | — | 491 | 14 | — | — |
|  | 2 | — | — | 493 | 12 | — | — |
|  | 3 | — | — | 499 | 15 | — | — |
|  | 4 | — | — | 489 | 16 | — | — |
|  | 5 | — | — | 493 | 18 | — | — |
| Example 11 | 1 | — | — | 493 | 16 | — | — |
|  | 2 | — | — | 492 | 18 | — | — |
|  | 3 | — | — | 494 | 19 | — | — |
|  | 4 | — | — | 489 | 19 | — | — |
|  | 5 | — | — | 491 | 18 | — | — |

Examples 12-19

Three grams of sulfur was added to 10 g of each of the samples obtained in Examples 1-8, and the mixtures were subjected to firing treatment in a nitrogen atmosphere at 1000° C. for 3 hours. After cooling to a room temperature, the resulting fired products were washed with 100 ml of 1N acetic acid and then further washed with 1 L of ion exchanged water, followed by drying with hot air at 150° C. to prepare phosphors. Peaks of emission by ultraviolet excitation and quantum efficiencies of the phosphors are shown in Table 4.

TABLE 4

|  | PL Peak nm | Quantum Efficiency (%) |
|---|---|---|
| Example 12 | 458 | 21 |
| Example 13 | 452 | 23 |
| Example 14 | 512 | 29 |
| Example 15 | 510 | 32 |
| Example 16 | 568 | 48 |
| Example 17 | 571 | 51 |
| Example 18 | 515 | 33 |
| Example 19 | 457 | 24 |

The results presented in Tables 1 and 3 show that in Examples 1-11, variations in doped metal concentrations over the reaction time were small, and concentration distributions of doped metals in the precipitated products were almost uniform. In the meantime, the concentrations of the metals doped into the precipitated products were maintained at a level close to the concentrations of the metals with respect to zinc sulfide, which are calculated based on the amounts of metals and zinc sulfide contained in the aqueous solution of the raw materials before the heating. This indicates that almost all the added metals were included in the precipitated products, i.e., the resulting sulfide precursors.

On the contrary, the results of the Comparative Examples summarized in Table 2 reveal that even some metal that was shown to be introduced into a precipitate in the above Examples was not introduced at all (e.g., iridium), or was introduced but in a significantly smaller amount (e.g., gallium), or showed a trend of a decreasing concentration over the reaction time (e.g., silver and copper). It can be understood from the results that amounts of doped metals in the precipitates and levels of doping uniformity in the Comparative Examples were significantly lower than those in the Examples of the present invention.

Table 4 indicates that the phosphor precursors obtained in the Examples of the present invention and comprising activator metal-doped zinc sulfide were converted into phosphors by the heating and firing treatment.

As can be clearly seen from FIGS. 1 to 4, in another aspect of the present invention, it is possible to control a particle size while maintaining uniformity of a concentration distribution of a doped metal in produced phosphor precursor particles, and thereby resulting precursor particles having a relatively small variation in particle size.

INDUSTRIAL APPLICABILITY

The present invention enables production of a phosphor precursor compound in which an activator metal is doped uniformly. Furthermore, since the present invention provide a benefit of reducing the loss of an expensive metal contained in the raw materials during the production process, and consequently producing a high-quality phosphor at low cost.

The invention claimed is:

1. A process for producing a Group II metal sulfide phosphor precursor, comprising:
    adding to an organic solvent an aqueous solution containing at least one of a Group II element compound, a sulfurizing agent, and a compound containing any of copper, silver, manganese, gold, and rare-earth elements to obtain a reaction mixture,
    heating the reaction mixture to produce an azeotrope of the water and the organic solvent, and
    removing the water from the reaction mixture to produce a desired Group II metal sulfide in the reaction mixture,
    wherein the removal of the water from the reaction mixture is carried out by recovering only the water condensed from a vapor produced by the azeotropic distillation.

2. The process of claim 1, wherein the Group II element compound is a zinc compound.

3. The process of claim 1, wherein the Group II element compounds is an organic acid salt of a Group II element, a mineral acid salt of a Group II element, or a combination thereof.

4. The process of claim 1, wherein an acid is added to the aqueous solution containing a Group II element compound, which is in the form of mineral acid salt, and the resulting acid containing solution is added to sulfurizing agent containing solution so that the pH of a reaction mixture is adjusted to 3 or below.

5. The process of claim 4, wherein the acid is a mineral acid.

6. A process for producing a Group II metal sulfide phosphor precursor, comprising adding, with mixing, to an organic solvent an aqueous solution containing at least one of a Group II element compound and a compound containing any of copper, silver, manganese, gold, and rare-earth elements and an aqueous solution containing a sulfurizing agent to obtain a reaction mixture,
heating the reaction mixture to produce an azeotrope of the water and the organic solvent, and
removing the water from the reaction mixture to produce a desired Group II metal sulfide in the reaction mixture,
wherein the removal of the water from the reaction mixture is carried out by recovering only the water condensed from a vapor produced by the azeotropic distillation.

7. The process of claim 6, wherein the Group II element compound is a zinc compound.

8. The process of claim 6, wherein the Group II element compound is an organic acid salt of a Group II element, a mineral acid salt of a Group II element, or a combination thereof.

9. The process of claim 6, wherein an acid is added to the aqueous solution containing a Group II element compound which is in the form of a mineral acid salt and the resulting acid containing solution is added to sulfurizing agent containing solution so that the pH of a reaction mixture is adjusted to 3 or below.

10. The process of claim 9, wherein the acid is a mineral acid.

11. A process for producing a Group II metal sulfide phosphor precursor, comprising:
adding an aqueous solution containing at least one of a Group II element compound and a compound containing any of copper, silver, manganese, gold, and rare-earth elements to an organic solvent in which a sulfurizing agent is dissolved, to obtain a reaction mixture,
heating the reaction mixture to produce an azeotrope of the water and the organic solvent, and
removing the water from the reaction mixture to produce a desired Group II metal sulfide in the reaction mixture,
wherein the removal of the water from the reaction mixture is carried out by recovering only the water condensed from a vapor produced by the azeotropic distillation.

12. The process of claim 11, wherein the Group II element compound is a zinc compound.

13. The process of claim 11, wherein the Group II element compound is an organic acid salt of a Group II element, a mineral acid salt of a Group II element, or a combination thereof.

14. The process of claim 11, wherein an acid is added to the aqueous solution containing a Group II element compound which is in the form of a mineral acid salt and the resulting acid containing solution is added to sulfurizing agent containing solution so that the pH of a reaction mixture is adjusted to 3 or below.

15. The process of claim 14, wherein the acid is a mineral acid.

16. A process for producing a Group II metal sulfide phosphor, comprising further firing a phosphor precursor produced by the process of claim 1.

17. The process of claim 16, wherein the Group II element compound is a zinc compound.

18. The process of claim 16, wherein the Group II element compound is an organic acid salt of a Group II element, a mineral acid salt of a Group II element, or a combination thereof.

19. The process of claim 16, wherein an acid is added to the aqueous solution containing a Group II element compound which is in the form of a mineral acid salt and the resulting acid containing solution is added to sulfurizing agent containing solution so that the pH of a reaction mixture is adjusted to 3 or below.

20. The process of claim 16, wherein a mineral acid is added to the aqueous solution containing a Group II element compound which is in the form of a mineral acid salt and the resulting acid containing solution is added to sulfurizing agent containing solution so that the pH of a reaction mixture is adjusted to 3 or below.

21. A process for producing a Group II metal sulfide phosphor, comprising further firing a phosphor precursor produced by the process of claim 6.

22. The process of claim 21, wherein the Group II element compound is a zinc compound.

23. The process of claim 21, wherein the Group II element compound is an organic acid salt of a Group II element, a mineral acid salt of a Group II element, or a combination thereof.

24. The process of claim 21, wherein an acid is added to the aqueous solution containing a Group II element compound which is in the form of a mineral acid salt and the resulting acid containing solution is added to sulfurizing agent containing solution so that the pH of a reaction mixture is adjusted to 3 or below.

25. The process of claim 21, wherein a mineral acid is added to the aqueous solution containing a Group II element compound which is in the form of a mineral acid salt and the resulting acid containing solution is added to sulfurizing agent containing solution so that the pH of a reaction mixture is adjusted to 3 or below.

26. A process for producing a Group II metal sulfide phosphor, comprising further firing a phosphor precursor produced by the process of claim 11.

27. The process of claim 26, wherein the Group II element compound is a zinc compound.

28. The process of claim 26, wherein the Group II element compound is an organic acid salt, a mineral acid salt or the combination thereof.

29. The process of claim 26, wherein an acid is added to the aqueous solution containing a Group II element compound which is in the form of a mineral acid salt and the resulting acid containing solution is added to sulfurizing agent containing solution so that the pH of a reaction mixture is adjusted to 3 or below.

30. The process of claim 26, wherein a mineral acid is added to the aqueous solution containing a Group II element compound which is in the form of a mineral acid salt and the resulting acid containing solution is added to sulfurizing agent containing solution so that the pH of a reaction mixture is adjusted to 3 or below.

* * * * *